United States Patent
Wynn et al.

(10) Patent No.: US 7,251,786 B2
(45) Date of Patent: Jul. 31, 2007

(54) MEETING INFORMATION

(75) Inventors: Roger Wynn, Redmond, WA (US);
Kevin P. Paulson, Redmond, WA (US);
Marieke Iwema, Seattle, WA (US);
Shawna Swanson, Issaquah, WA (US);
Greg Manto, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 10/373,093

(22) Filed: Feb. 26, 2003

(65) Prior Publication Data

US 2004/0168133 A1    Aug. 26, 2004

(51) Int. Cl.
*G06F 3/00*    (2006.01)
(52) U.S. Cl. ............................ 715/744; 715/541; 705/9
(58) Field of Classification Search ................ 715/541, 715/744; 705/9
See application file for complete search history.

(56) References Cited

U.S. PATENT DOCUMENTS

| | | | | |
|---|---|---|---|---|
| 5,165,012 A | * | 11/1992 | Crandall et al. ............ 715/809 |
| 5,802,516 A | * | 9/1998 | Shwarts et al. .................. 707/6 |
| 5,898,434 A | * | 4/1999 | Small et al. .................. 715/810 |
| 6,239,801 B1 | * | 5/2001 | Chiu et al. ............... 715/500.1 |
| 6,336,125 B2 | * | 1/2002 | Noda et al. .................. 715/531 |
| 6,452,615 B1 | * | 9/2002 | Chiu et al. .................... 715/776 |
| 6,587,895 B1 | * | 7/2003 | Golovchinsky et al. ........ 710/12 |
| 2002/0079371 A1 | * | 6/2002 | Bobrow et al. ............. 235/454 |
| 2002/0172421 A1 | * | 11/2002 | Kondo et al. ................ 382/173 |
| 2003/0004776 A1 | * | 1/2003 | Perrella et al. .................. 705/9 |

OTHER PUBLICATIONS

B. Azvine et al., "The Intelligent Assistant: An Overview," *Intelligent Systems and Soft Computing*, LNAI 1804, pp. 215-238, 2000.

* cited by examiner

*Primary Examiner*—Kristine Kincaid
*Assistant Examiner*—Ryan Pitaro
(74) *Attorney, Agent, or Firm*—Banner & Witcoff, Ltd.

(57) ABSTRACT

Electronic note taking is enhanced by automatically modifying an electronic document corresponding to a user's meeting notes to include at least some data from an electronic calendar or scheduling system in which the user's meeting is scheduled. For example, when an electronic note is created for a specific meeting, information about the meeting from the user's electronic calendar or scheduling system can automatically be included in the new electronic note. This information may be provided in the note in a form that allows it to be electronically searched and shared with others.

36 Claims, 8 Drawing Sheets

Document: Board of Directors Meeting - September 12, 2002

Subject: Board of Directors Meeting

Start: September 12, 2002, 2:00 PM

End: 3:00 PM

Organizer: Mary Beth Smith

Attendees: John Doe, CEO; Jane Doe, CFO; James Doe, President; John Q. Public, Vice President of Technology; Jane Q. Public, Vice President of Marketing; Roger Public, Board Member; Monica B. Public, Board Member; Tammy J. Doe, Board Member; Nigel R. Public, Board Member; Nicole M. Doe, Board Member; David R. Public, Board Member Location: Board of Directors Conference Room

*My meeting notes:*

Meeting Start    Meeting End

FIG. 6

Insert Meeting Information - Today's Meetings

Tap to Select a Meeting and Include Its Information in Your Notes

Thursday, September 12, 2002

11:00   11:00 AM - 12:15 PM: Branding/Trademark Meeting
12:00   12:15 PM - 1:30 PM: Lunch with Potential Investors
1:00
2:00    2:00 PM - 3:00 PM: Board of Directors Meeting
3:00    3:00 PM - 4:00 PM: Manager Meeting
4:00    4:20 PM - 5:00 PM: Shareholder Conference Call Meeting Information Please Specify the Information to display in the Meeting Information Box in Your Notes:

☐ Subject                ☐ Save Notes using "Subject" as Document Name
☐ Date and Time
☐ Location
☐ Organizer              ☐ Save Notes using "Subject" and "Date and Time" as Document Name
☐ Attendees ( OK )   ( Cancel )   ( Apply )

MEETING INFORMATION

FIELD OF THE INVENTION

The present invention generally relates to systems and methods for creating, using, and storing electronic documents in which the electronic documents may be automatically modified to include relevant information relating to meetings that the user is attending. Such systems and methods, at least in some examples of the invention, may be used in combination with electronic calendars or scheduling systems.

BACKGROUND

Electronic calendars or scheduling systems typically are designed to allow users to input various information about upcoming events scheduled by or for the user. For example, a user and/or a third party may enter information about an upcoming meeting that appears on the user's calendar and that the user is expected or invited to attend. As non-limiting examples, calendar programs of this type may allow a user (or a third party) to enter information concerning: (a) the meeting name; (b) the subject matter of the meeting; (c) the scheduled start time; (d) the scheduled end time; (e) the meeting date; (f) the meeting location; (g) the name of the meeting organizer or sponsor; (h) a list of invited attendees; (i) keynote speaker(s); (j) an agenda; (k) a schedule; (l) other personalized messages; and the like.

When attending meetings, many people like to, or are required to, take notes relating to the meeting. Typically, these notes are taken using conventional pen and paper. Such pen and paper notes, while helpful in some respects, are of limited usefulness. For example, unless the note-taker makes special efforts to carefully file the notes, pen and paper notes have a tendency to be lost, misfiled, misplaced, or destroyed. Additionally, it can be difficult and time-consuming to locate particular information in pen and paper notes because such notes can only be searched manually. Also, pen and paper notes typically are not available to others unless the note-taker makes a special effort to copy and distribute the notes to his/her colleagues.

Recently, electronic note taking systems have become more popular, such as in note-taking applications provided in stylus or pen-based computing systems, such as available in "tablet PCs." Tablet PCs allow users to take electronic handwritten notes directly on a digitizing computer screen, and the computing system saves these notes in electronic form. Advantages of electronic notes in this form include the ability to easily save, file, and locate the notes; the ability to accurately and quickly electronically search and retrieve a desired set of relevant notes; the ability to quickly and accurately convert handwritten notes to machine-generated text form; the ability to use the notes in other applications (e.g., by pasting into an email document or a word processing document); and the ability to allow others easy access to the notes and/or their electronic counterparts.

While an improvement over conventional pen and paper notes, electronic notes also can suffer from drawbacks that limit their usefulness. For example, unless a user is a very thorough and careful note-taker, many meeting notes may omit certain information that can make it easier for the original note-taker, as well as others, to find a relevant set of notes or to find specific information within a relevant set of notes. An electronic note-taking system that automatically modified the electronic notes relating to a meeting to include certain core identifying information relating to that meeting may be very useful in cataloging notes, filing notes, and making notes more searchable and useful to both the original note-takers and to third parties that have access to the electronic notes.

SUMMARY

Aspects of the present invention relate to systems and methods that include: receiving data including meeting information (e.g., via an input device); providing an electronic document capable of receiving and saving a user's input (e.g., as electronic ink, typed notes, etc., in an application program); and automatically modifying the electronic document to include at least some of the meeting information (e.g., using a computer processor). In some examples, prior to automatically modifying the electronic document, the method further includes receiving input indicating the meeting information to be included in the electronic document. The meeting information that may be included in the electronic document, in at least some examples of this invention, may include: a meeting title; a scheduled meeting start time; a scheduled meeting end time; actual meeting start time; actual meeting end time; a scheduled meeting date; actual meeting date; a scheduled meeting location; actual meeting location; a meeting organizer; a list of meeting invitees or attendees; and the like. In some examples, the electronic document may be saved automatically under a name derived from at least a portion of the meeting information (e.g., the meeting title and/or date). The meeting information may be located at any location in the electronic document, such as, at the beginning of the document, in the background (e.g., as a "watermark") in the document, in a header or footer, in metadata associated with the document, etc. The systems and methods according to at least some examples of the invention may operate in combination with electronic calendars or scheduling systems.

BRIEF DESCRIPTION OF THE DRAWINGS

The above and other objects, features, and advantages of the present invention will be readily apparent and fully understood from the following detailed description, taken in connection with the appended drawings, which include:

FIG. 1b, which illustrates additional features of the user interface display example shown in FIG. 1a;

DETAILED DESCRIPTION

As described above, aspects of the present invention relate to systems and methods that allow electronic documents to be modified automatically to include predetermined and/or pre-designated meeting information, such as meeting information obtained from an electronic calendar or scheduling system. The following describes various examples of the invention in more detail.

The following description is divided into sub-sections to assist the reader. The sub-sections include: Terms, Meeting Information in General, Example Systems and Methods Using Meeting Information, Example Hardware, and Conclusion.

I. Terms

The following terms are used in this specification:

Render—The process of determining how text, graphics, and/or electronic ink are to be displayed, whether on a display screen, printed, or output in another format.

Electronic calendar or electronic scheduling system—These terms are used interchangeably in this application to refer to an electronic system for tracking a user's meetings or appointments. Electronic systems for calendars, and/or scheduling are known to those skilled in the art.

Meeting—An event, activity, gathering, assembly, class, conference, convention, summit, get-together, congregation, reunion, or the like that may be prescheduled or impromptu. Unless otherwise indicated, the term "meeting" is intended to have broad scope and is not limited to formal, scheduled events or gatherings.

Meeting Information—Factual information regarding a meeting. "Meeting information" may include, but is not necessarily limited to: a meeting title; a list of subjects on an agenda; a list of actual subjects discussed; a scheduled meeting start time; a scheduled meeting end time; actual meeting start time; actual meeting end time; a scheduled meeting date; actual meeting date; a scheduled meeting location;

actual meeting location; a meeting organizer; a list of meeting attendees; a list of meeting invitees; a list of scheduled speakers; a list of actual speakers; a meeting agenda; a meeting schedule; a user message regarding the meeting; and the like. Data including "meeting information" may be present, for example, in an electronic calendar system, and it may be located in, inserted into, and/or otherwise associated with an electronic document.

II. Meeting Information In General

Examples of the present invention may be used in conjunction with an electronic calendar or an electronic scheduling system. Electronic calendars or scheduling systems may be designed to allow users to input various information about upcoming events scheduled by or for the user. For example, a user and/or a third party may enter and/or download information about a meeting that is to appear on the user's calendar and which the user plans or is expected to attend. As non-limiting examples, an electronic calendar program may allow a user (or a third party) to enter and/or download information concerning: (a) the meeting name; (b) the subject matter of the meeting; (c) the scheduled start time; (d) the scheduled end time; (e) the meeting date; (f) the meeting location; (g) the name of the meeting organizer or sponsor; (h) a list of invited attendees; (i) keynote speaker (s); (j) an agenda; (k) a schedule; (l) other personalized messages; and the like.

Some examples of the invention relate to systems and methods that include: receiving data including meeting information (e.g., via an input device, downloaded from the Internet or another source, etc.); providing an electronic document capable of receiving and saving a user's input (e.g., as electronic ink, typed notes, etc., in an application program); and automatically modifying the electronic document to include at least some of the meeting information (e.g., using a computer processor). In some examples of the invention, prior to automatically modifying the electronic document, the method further includes receiving input, e.g., from a user, a third party, or other source, indicating the meeting information to be included in the electronic document. The meeting information that may be automatically included in the electronic document, in at least some examples of this invention, may include: a meeting title; a list of subjects on an agenda; a list of actual subjects discussed; a scheduled meeting start time; a scheduled meeting end time; actual meeting start time; actual meeting end time; a scheduled meeting date; actual meeting date; a scheduled meeting location; actual meeting location; a meeting organizer; a list of meeting attendees; a list of meeting invitees; a list of scheduled speakers; a list of actual speakers; a meeting agenda; a meeting schedule; a user message regarding the meeting; and the like. In at least some examples of the invention, the meeting information is obtained from an application program different from the application program that provides the electronic document.

In some examples of systems and methods according to the invention, the electronic document may be automatically saved under a name derived from at least a portion of the meeting information. For example, the electronic document may be saved automatically under a name that includes the meeting title and/or date.

While, if desired, the meeting information may appear at any location in the rendered electronic document, in some examples of the invention, the electronic document is modified to provide at least some of the meeting information as a first visible portion of the electronic document when rendered. In other examples, at least some of the meeting information may be provided in a background of the electronic document (e.g., as a watermark) when the electronic document is rendered. In still other examples of the invention, at least some of the meeting information may be provided in a header or a footer of the electronic document. In still other examples of the invention, the electronic document may be tagged with metadata that represents at least some of the meeting information, and at least some of the meeting information may or may not appear in the rendered electronic document. Of course, these various options for placement of meeting information in an electronic document may be used independently, together in any combinations, and/or together with other possible information and/or arrangements.

Once included within and/or otherwise associated with an electronic document, the meeting information in or associated with the electronic document may be static and unchangeable by the user, in some examples of the invention. As another alternative, in some examples of the invention, the meeting information included in or associated with the electronic document may be freely modifiable by the user. In these examples, if the user desires to change information contained in the automatically provided meeting information (e.g., changing time, date, attendees, etc.), he or she will be freely able to make these modifications, e.g., using a mouse, keyboard, stylus, or other appropriate user input device(s).

Additionally, systems and methods according to at least some examples of this invention will issue a reminder at or before a scheduled meeting start time.

Still other examples of systems and methods according to the invention will allow the user to specify or modify at least a portion of the meeting information to be included in an electronic document, e.g., using an electronic user interface. Specifications and/or modifications of this nature may occur on a document-by-document basis and/or may be made within a default profile that defines the meeting information to be included in newly opened electronic documents.

Additional aspects of this invention relate to systems and methods for providing an electronic calendar system capable of receiving data including meeting information; providing an electronic note taking application, wherein the electronic note taking application is capable of receiving a user's input and saving the input as an electronic document; and automatically modifying the electronic document to include at least some of the data from the electronic calendar system including the meeting information. The meeting information data can come from any source, such as through user input (e.g., via electronic ink, keyboard, mouse, etc.); from a memory (e.g., disk, CD ROM, internal computer memory, etc.); downloaded from the Internet or other network or source, etc. Various additional features, like those described above, also can be included in the systems and methods according to these examples of the invention.

Electronic documents including meeting information in this manner typically make entry of important and useful meeting information into the notes quicker, easier, and more accurate, while providing better note indexing and searchability, for example, on attendees, date, subject, location, or the like. The following includes a more detailed description of various example systems and methods according to the invention, including description of examples of various user interfaces that may be used in conjunction with some examples of this invention.

III. Example Systems and Methods Using Meeting Information

Figure 1A:
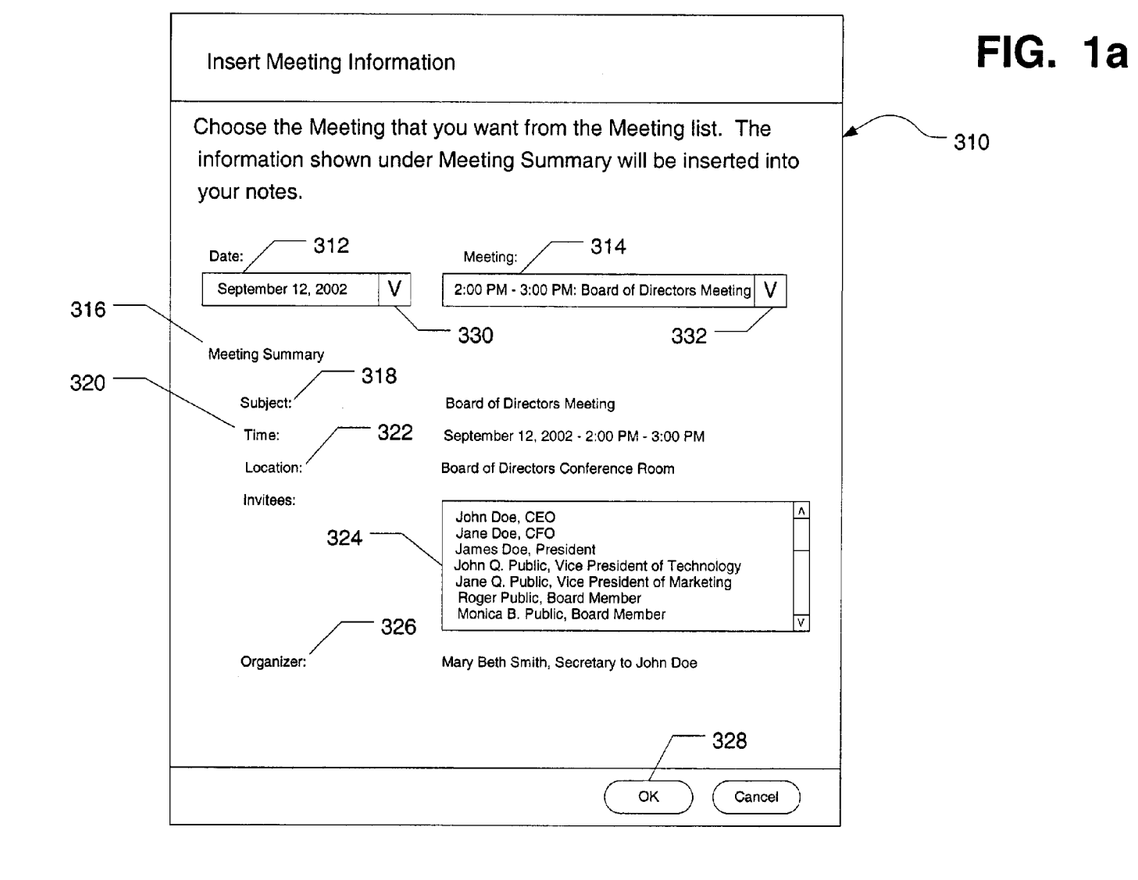
FIG. 1a, which illustrates a user interface display for use in inserting meeting information into an electronic document in accordance with some examples of this invention.

FIG. 1a illustrates an example of a user interface display screen 310 that may be used in some examples of the invention in applying meeting information from an electronic calendar to an electronic note taking application. At some time in this process, systems and methods according to this example of the invention prompt the user to identify the meeting and/or meeting information to be included in an electronic note corresponding to the meeting. In the illustrated example, the user interface prompts the user to identify the meeting to which a new or existing electronic note belongs, for example, by querying the user to specify the date 312 and other identifying information regarding the meeting, such as the time and/or name of the meeting 314.

When a meeting is identified by date block 312 and/or meeting identification block 314, the user interface screen 310 may display additional information to the user. In the illustrated example, a "Meeting Summary" 316 is provided, which in the illustrated example includes the subject or title of the meeting 318, its scheduled time 320, and its scheduled location 322. Additionally, in this example, the Meeting Summary 316 includes a list of invitees 324 (in a familiar scrollable box) and the name of the meeting organizer 326. Of course, any other suitable or desired information could be provided in the Meeting Summary 316 and in the "Insert Meeting Information" interface 310 without departing from the invention.

In some examples of the invention, utilizing a system clock present in the computer or on the network system on which the electronic calendar and/or electronic note taking application is/are running, the Insert Meeting Information interface 310 will appear with initial or default information corresponding to the next meeting that appears on the user's schedule. In this way, in many instances, the default information appearing in the meeting date block 312, the meeting identification block 314, and the meeting summary block 316 will be correct. By clicking on the OK button 328, the selected meeting information will automatically appear in a new (or existing) electronic note for that meeting.

Figure 1B:
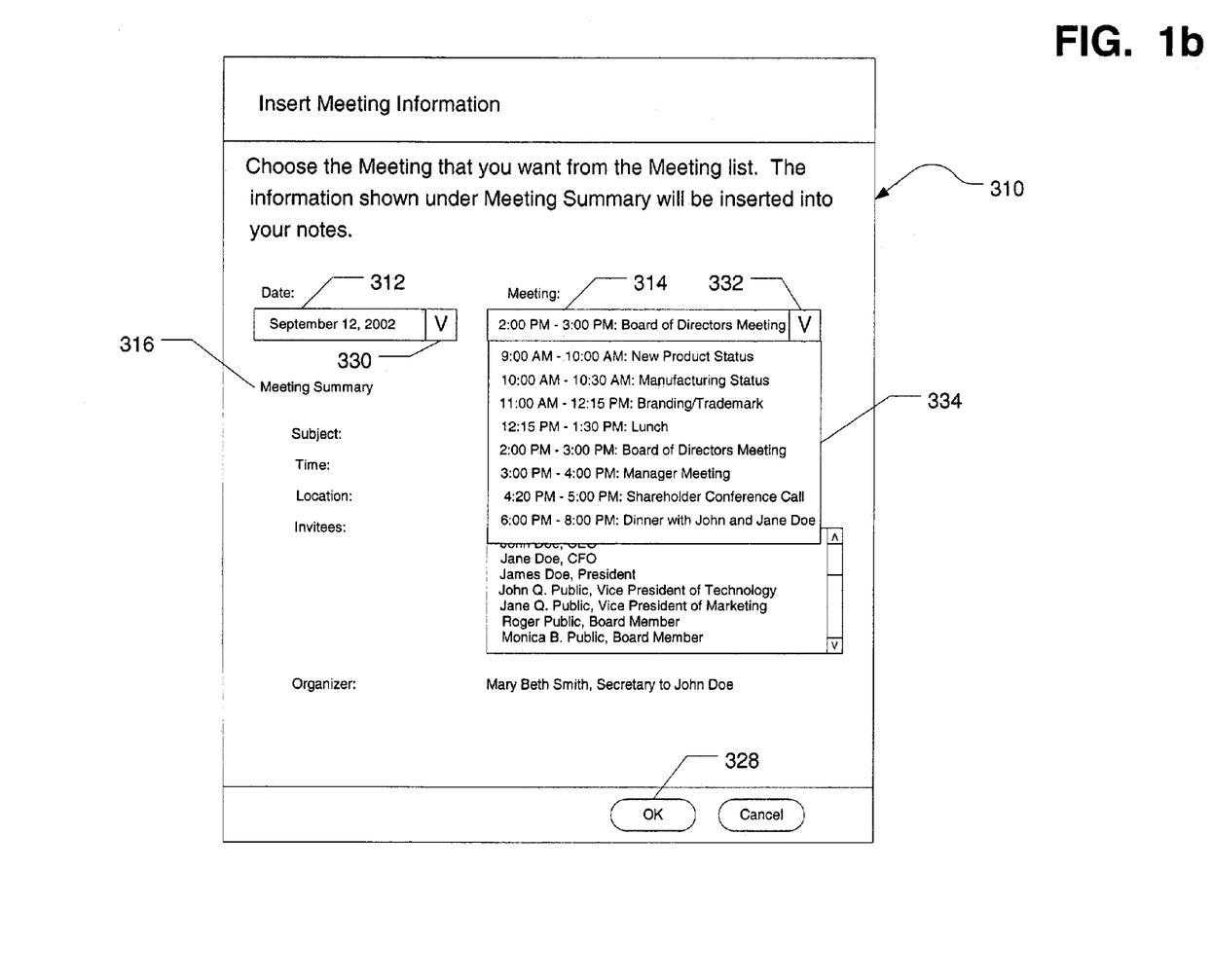

However, in some instances, the user will desire to start a new electronic document including meeting information for a meeting other than the next meeting on his or her schedule. For example, in some instances, a meeting unexpectedly will be delayed or occur earlier than scheduled. FIGS. 1a and 1b illustrate one example of how systems and methods according to the present invention may allow a user to change the meeting identification information to appear in the electronic note. In this example, both the date block 312 and the meeting identification block 314 contain pull down menus 330 and 332, respectively. When the user clicks on the pull down menu, as illustrated in FIG. 1b, a list of scheduled meetings 334 for the selected date appears. The user can then select one of these scheduled meetings in list 334, and the Meeting Summary information 316 will change to correspond to that newly selected meeting. Once a new meeting is selected (e.g., from the listing 334), when the user clicks the OK button 328, this newly selected meeting information will appear automatically in the electronic note. The date can be changed in a similar manner by clicking on the date pull down menu 330 and selecting a different date.

Any suitable way of allowing the user to select a different meeting may be used without departing from the invention. For example, rather than providing the pull down menus 330 and 332, the user interface 310 could provide an avenue that takes the user directly into his/her electronic calendar and allows the user to select a meeting and/or date directly from the calendar (e.g., by clicking on a "GO TO CALENDAR" button). Also, if desired, the user interface screen 310 could include an option that allows the user to enter meeting information for a new meeting that is not on the electronic calendar and/or start an electronic note without including meeting information. Other alternatives also are possible.

Of course, the designated meeting information may be imported into the electronic note corresponding to the meeting at any suitable time in the process. For example, the user interface screens 310 of FIGS. 1a and 1b could appear as soon as the user opens a new document in an electronic note taking application. As other alternatives, the "Insert Meeting Information" interface display 310 could be called up by the user and/or the system at any time after the note taking process has begun, even immediately before finally saving the electronic notes and/or exiting the note taking application. As still another alternative, the "Insert Meeting Information" interface display 310 could appear automatically whenever a user closes an electronic note or exits the note taking application. Additionally, an "Insert Meeting Information" type interface display, like that shown in FIGS. 1a and 1*b*, may be accessed from the electronic calendar and a new electronic note may be opened after the meeting is specified.

Figure 2:
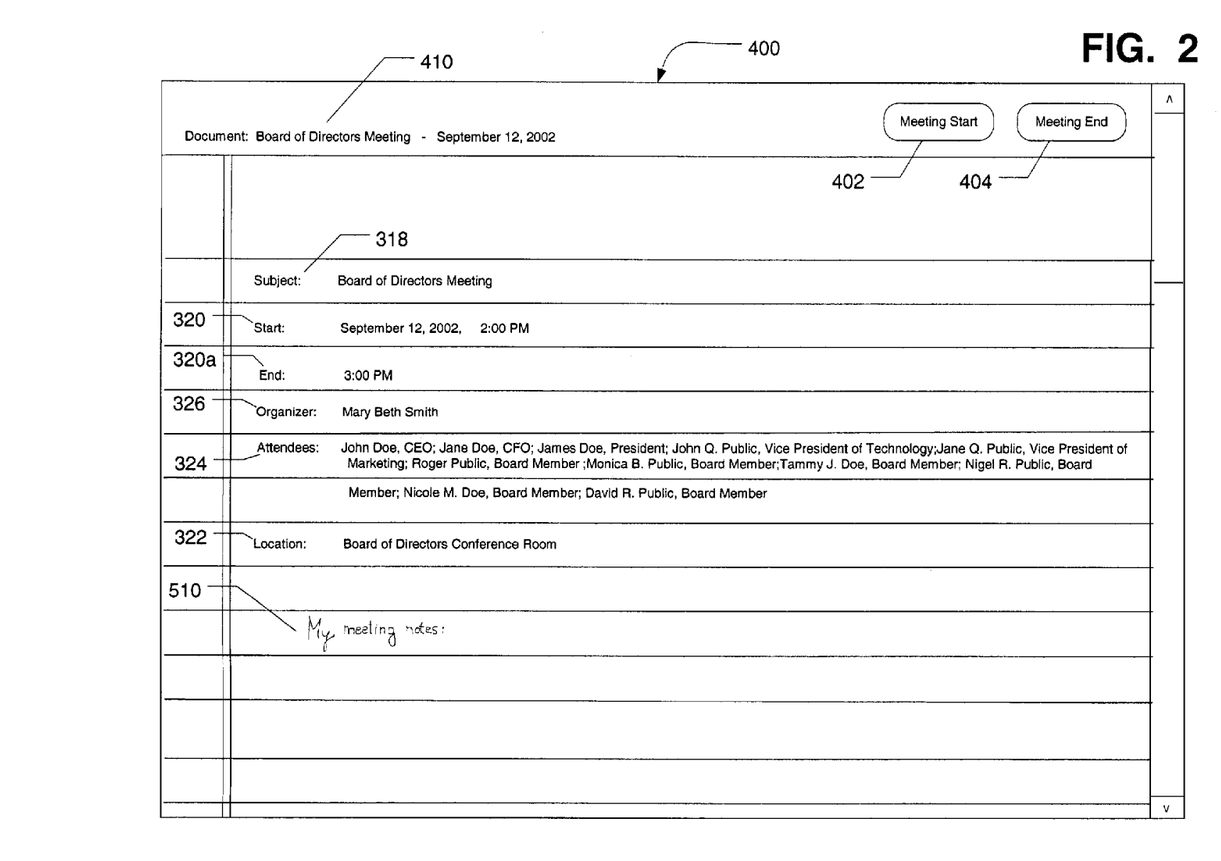
FIG. 2, which illustrates an example of an electronic document automatically modified to include meeting information in accordance with one example of this invention.

The meeting information also can appear at any suitable location in the electronic document and/or otherwise associate with the electronic document without departing from the invention. For example, FIG. 2 illustrates an example of an electronic document 400 opened in a note taking application after a meeting is selected, e.g., from the Insert Meeting Information interface like that illustrated in FIGS. 1*a* and 1*b*. In this example, the 2:00 PM Board of Directors Meeting was selected from the menu 334 shown in FIG. 1*b*. Once selected (e.g., by clicking the OK button 328, by double clicking on the meeting, etc.), a new electronic document 400 is opened (or an existing electronic document 400 is modified), and at least some of the meeting information from the electronic calendar or schedule appears within and/or otherwise associates with the electronic document 400. In this illustrated example, the beginning of electronic document 400 is automatically modified to include the title or subject of the meeting 318, the start time and date 320, the end time 320*a*, the organizer 326, the attendees 324, and the location 322. If necessary, in some examples of the invention, electronic ink or other text in the electronic document (if any) may be shifted downward (or moved in another appropriate direction) to make room for the inserted meeting information. Of course, any information or combination of information can be included in the meeting information provided in the electronic note 400 without departing from the invention.

The meeting information included in the electronic note 400, however, need not be limited to the specific information included in the meeting information of the electronic calendar. For example, rather than (or in addition to) listing the scheduled start and stop times 320 and 320*a*, the electronic note 400 could be adapted to automatically include the actual meeting start and stop times (e.g., by having the user activate a "meeting start" button 402 and "meeting end" button 404 provided as part of a toolbar in the electronic note taking application, by noting the note opening and/or closing times, etc.). As another example, rather than listing the meeting invitees (who may or may not have elected to attend the meeting), the meeting information included in the electronic note 400 may include the names of the persons that actually attended the meeting. This information could be provided, for example, by having the user click on the names of the actual meeting attendees from the invitee listing 324 in user interface display 310. As another alternative, all invitee names could be transferred from the meeting information interface and a user may, if desired, amend the list of invitees to correspond to the people that actually attended the meeting (e.g., by adding names to and/or subtracting names from the invitee list).

While the meeting information contained in the electronic note 400 may be static and unchangeable by the user, in some examples of the invention, elements of the meeting information contained in the electronic note 400 may be "hot." For example, a user may click or tap on a name present in the meeting information and be taken directly to an email interface screen with the start of an email message addressed to that person. Also, as discussed above, names can be removed from and/or added to the list of attendees, to reflect actual meeting attendance. Other meeting information also may be added, deleted, or otherwise modified without departing from the invention. Also, in some examples of the invention, modifications to the meeting information contained in the electronic note 400 also may be sent back to the original meeting object in the electronic calendar system (or other system) from which the meeting information originated, and that system also can be modified to include the updated meeting information data.

As another feature, present in at least some examples of the invention, the electronic note taking application may be adapted to automatically use at least some of the meeting information as the title or name 410 of the electronic document 400 when saved. In the illustrated example, the electronic document 400 is saved with a name 410 that corresponds to the meeting subject 318 and the meeting date 312. Of course, any desired information could be included in the title or name 410 without departing from the invention. Moreover, the user interface could provide this automatic name 410 as a default option to the user and give the user an opportunity to change the name 410, if they desire.

Figure 3:
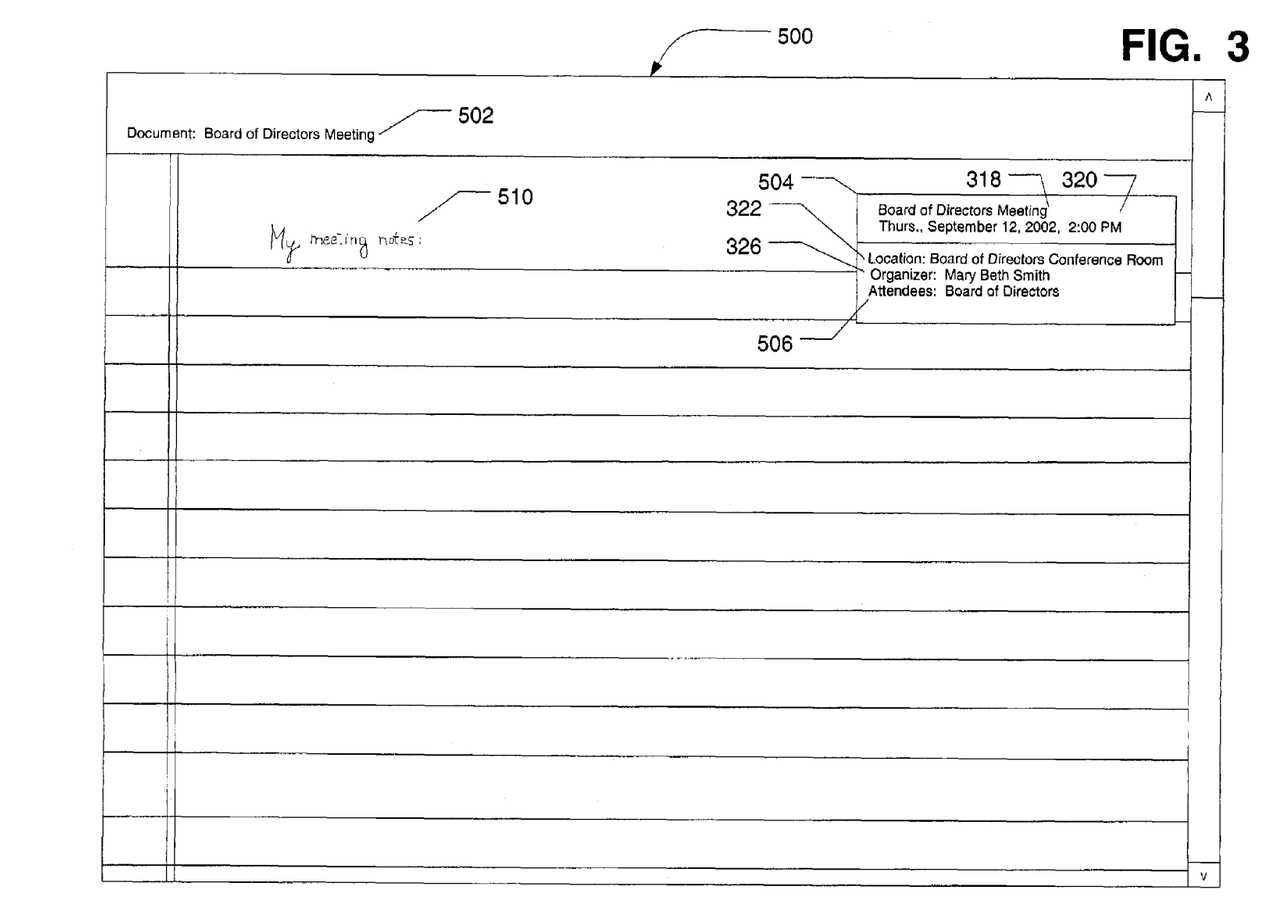
FIG. 3, which illustrates another example of an electronic document automatically modified to include meeting information in accordance with another example of this invention.

FIG. 3 illustrates another example of an electronic document 502 having meeting information inserted therein. As shown in this example, the user interface display 500 includes an electronic document 502 entitled "Board of Directors Meeting." The title of the electronic document 502, as described above, may be inserted automatically (optionally with the user's confirmation and/or potential changes before finally accepting this title). In this example, the electronic document title includes the subject 318 of the meeting (see FIG. 1*a*), but not the meeting date 320 (as shown in the example of FIG. 2). Of course, the electronic document title may automatically include any desired information without departing from the invention.

In this illustrated example, the meeting information appears in a meeting information block 504 located at the right hand side of the electronic document 502. The meeting information block 504 in this example includes the meeting subject 318, the meeting start time and date 320, the meeting location 322, the meeting organizer 326, and the meeting attendees 506. Of course, as with the previously described examples, this meeting information block 504 may include any desired information without departing from the invention.

In this instance, the meeting attendees 506 are identified in the meeting information block 504 by a group title ("Board of Directors," in this example) rather than including each individual person's name. Systems and methods according to this example of the invention can obtain the title information from any suitable source. For example, the information identifying the members of the Board of Directors may be previously saved on the computer or otherwise made available to the computer (akin to an email "alias" group) so that the user could select this group when entering the meeting information or at another appropriate time. As another alternative, the user could simply enter the words "Board of Directors" when the system asks him or her to identify the invitees and/or attendees for the electronic calendar and/or for the electronic note 502. Any other way of inserting this information into the meeting information block 504 may be used without departing from the invention.

Of course, while the meeting information block 504 is illustrated in the upper right hand corner of the electronic document 502 in FIG. 3, this location is merely exemplary. The system may be set up to render the meeting information block 504 at any desired location in the electronic document 502 without departing from the invention. For example, the meeting information may appear in a header and/or footer on one or more pages of the electronic document. As another example, a user could be allowed to freely select and/or modify the location of the meeting information block 504.

As still another example, systems and methods according to some examples of the invention may render the meeting information block 504 so that it permanently stays at one location on the user interface screen 500 irrespective of the user's location within the electronic document 502. In other words, as an example, the meeting information block 504 could always appear at the same location (e.g., the upper right hand corner) of the display, even as the user scrolls to other locations in the electronic document 502. In this event, the meeting information block 504 may be in a separate "layer" that totally or partially overlays and/or obscures and/or underlays information in the electronic document 502.

As yet another example, the meeting information of the examples illustrated in FIGS. 2 and/or 3 may appear as a "watermark" on one or more pages of an electronic document, without departing from the invention. While numerous options and alternatives are possible without departing from the invention, in some examples, this "watermark" appears on all pages of the rendered electronic document as a light gray or other color with electronic ink and/or other information present in the electronic document overlaying the watermark.

When rendered, the meeting information may appear on every page of the document, on the first page, on the last page, or in any other desired manner (optionally selectable by the user), without departing from the invention.

In some examples of the invention, the meeting information may not appear in the rendered document, but it may otherwise associate with the electronic document. For example, the meeting information may be available in metadata associated with the electronic document. An icon or other indicator may be used, if desired, to inform the user that there is meeting information associated with a particular note. Meeting information present in this manner (e.g., in metadata) may be electronically searchable along with or in addition to the electronic document and/or otherwise readily available to the user for various purposes. Meeting information also may be associated with an electronic document in other ways as well, for example, by pointers that tie a data set associated with the meeting information to a data set associated with the electronic document, and vice versa. In still other examples, meeting information may be both associated with an electronic document (e.g., in metadata) and also within and visible in renderings of the electronic document (although the meeting information associated with the electronic document is not necessarily the same as that provided within and rendered with the electronic document).

As another option available with at least some examples of the invention, metadata (including meeting information) associated with an electronic document may be used to tie one or more meetings together. For example, if a user is involved in a recurring meeting (e.g., a weekly status videoconference call relating to product development), metadata may be used to tie the electronic notes relating to these meetings together.

As illustrated in FIGS. 2 and 3, the actual meeting information (e.g., meeting information box 504) may appear automatically as machine-generated text, while the user's notes 510 may be entered in electronic or digital ink. Alternatively or in addition, the electronic notes also may be entered into the document using a conventional keyboard and/or mouse type input system.

Figure 4:
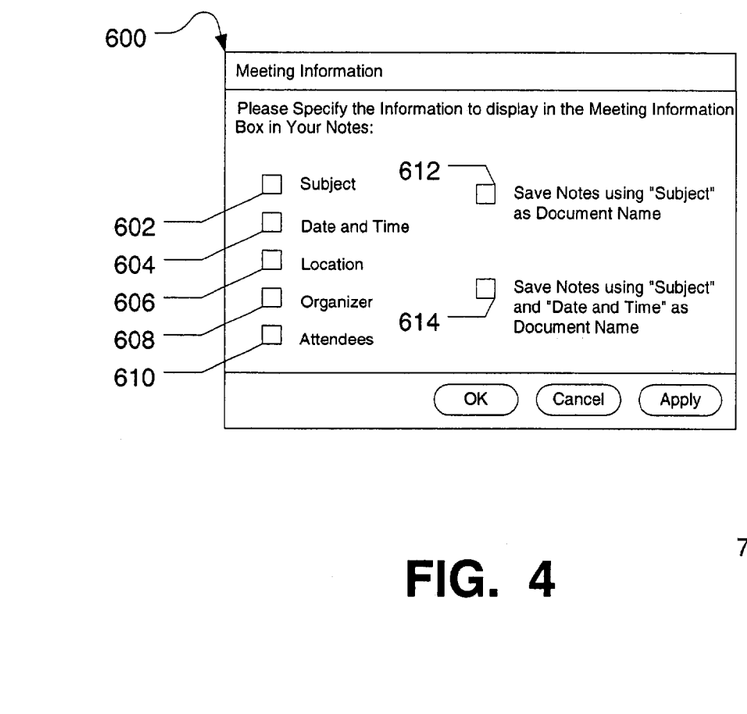
FIG. 4, which illustrates a user interface display according to one example of the invention wherein a user can select and/or modify the meeting information to be automatically incorporated into an electronic document.

FIG. 4 illustrates an example of a user interface screen 600 that allows users of some examples of systems and methods according to this invention to select at least some of the information that will appear in the meeting information block. In this illustrated example, the systems and methods prompt the user to specify the information they desire to have appear in the Meeting Information Box when opening and/or otherwise modifying an electronic note corresponding to a meeting. This illustrated example allows the user to specify among the options subject 602, date and time 604, meeting location 606, meeting organizer 608, and meeting attendees 610. Of course, the interface 600 may present any desired options to the user, and the user may select any item or combination of items from the listing without departing from this invention.

The user interface screen 600 of FIG. 4 (or another suitable interface) may appear each time the user opens or begins an electronic note associated with a meeting. As another alternative, a user interface screen 600 like that illustrated in FIG. 4 could appear the first time the user produces an electronic note for a meeting, and the selected information then may be used by the system as a default profile for future meetings. Of course, systems and methods according to examples of the invention may allow users to freely modify the information to be included in an individual meeting's electronic document and/or in a default profile for future electronic documents.

FIG. 4 illustrates examples of additional information that users may specify for meeting information input in accordance with at least some examples of this invention. In the illustrated example, a user may select the option 612 of saving the electronic notes using the "Subject" information as the electronic document's title. Another option 614 allows the user to select the option of saving the electronic document using the "Subject" and "Date and Time" as the electronic document's name or title. Of course, numerous other options may be made available to the user and/or other ways of presenting the various options to the user may be used without departing from the invention.

Figure 5:
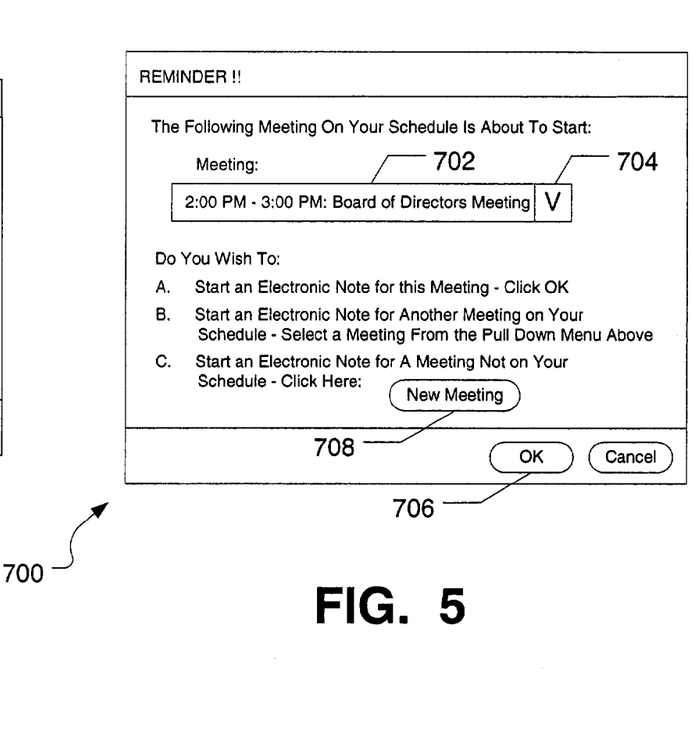
FIG. 5, which illustrates an example of a reminder system that may be used in accordance with some examples of the invention.

FIG. 5 illustrates an example of a user interface screen 700 that reminds and/or informs a user when a scheduled meeting time is approaching (which may be used in conjunction with an electronic scheduler or calendar in which the user's meeting schedule is entered and a system clock). In this example, the system automatically triggers a reminder a predetermined time before (and/or at) the meeting start time. The reminder interface screen 700 advises the user when a scheduled meeting is approaching through dialog box 702. If the user would like to start an electronic meeting note for the meeting that appears in the dialog box 702, she can do so by clicking the OK button 706, as instructed by Option A in the interface screen 700. Clicking OK 706 automatically opens a new meeting note for the specified meeting, and this meeting note will automatically include the previously specified meeting information, for example, the information specified by the user using interface screen 600 in FIG. 4.

As other options, the interface screen 700 of FIG. 5 may allow the user to start a new electronic note for a different meeting. For example, by following the instructions provided in Option B, the user can start an electronic note for any meeting currently on the schedule. The methods and systems according to this example of the invention can obtain the identity of this new meeting in any suitable manner. For example, as shown in FIG. 5, the user can click on pull down menu 704 to obtain a list of meetings on his/her schedule and select from those meetings. As another option, this pull down menu 704 (or some other suitable interface)

may allow the user access to his/her electronic schedule or calendar and enable him/her to select a meeting from the entire calendar.

Option C in the interface screen 700 of FIG. 5 allows the user to start an electronic note for a meeting not on the schedule by clicking the "New Meeting" button 708. Clicking on this button 708 may take the user to a new interface screen or electronic calendar in which information for the new meeting can be entered. As another alternative, clicking on button 708 may open a new electronic document that does not include any meeting information, and the user may be given an option later of adding in any desired meeting information. Of course, systems and methods according to examples of the invention can provide other ways of allowing a user to open new electronic documents and/or enter meeting information, in any desired order, without departing from the invention.

Figure 6:
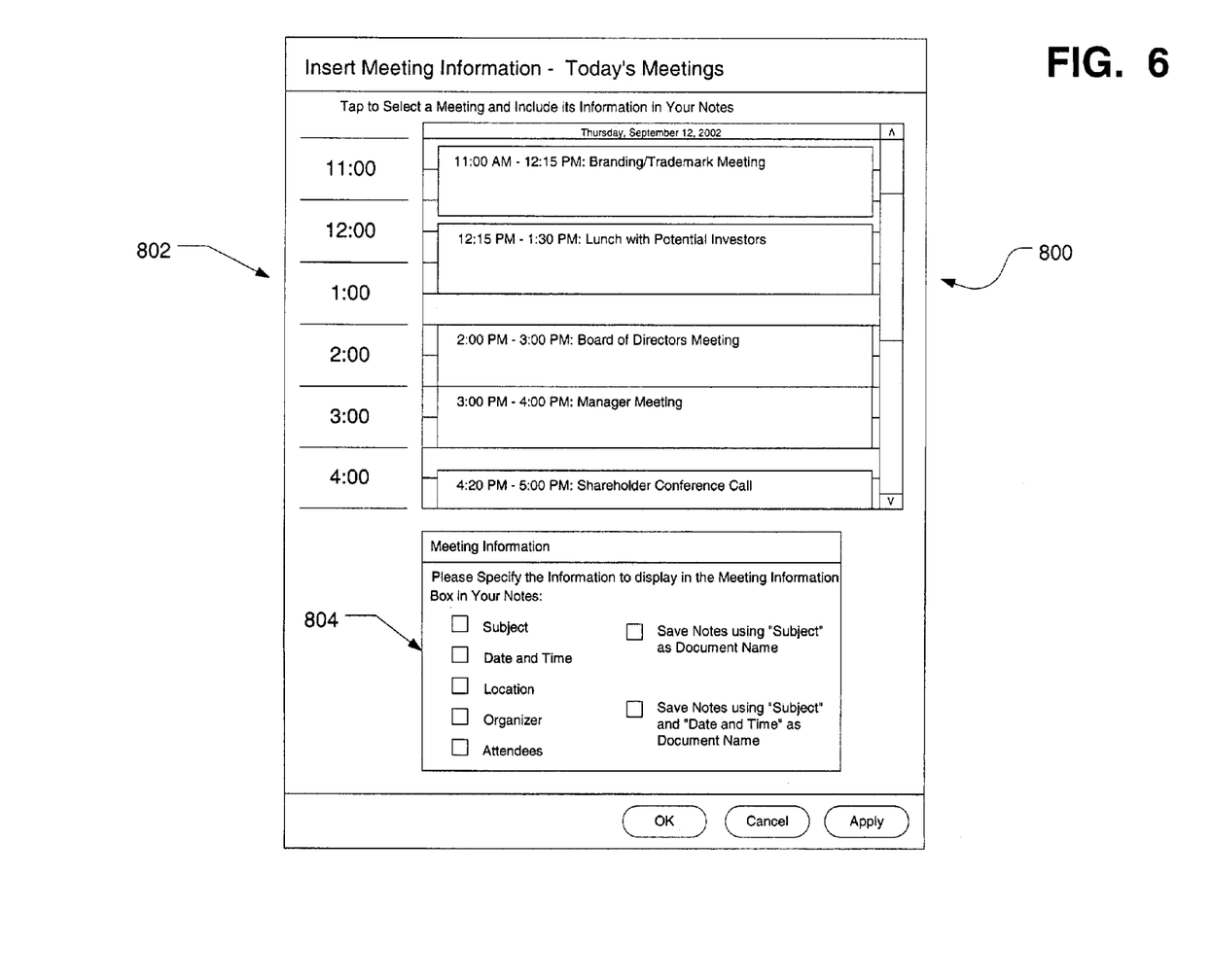
FIG. 6, which illustrates another example of a user interface display useful in selecting meeting information for inclusion in an electronic document according to another example of the invention.

FIG. 6 illustrates yet another example of a user interface screen 800 from which an electronic note including meeting information may be created. In this example, a list of meetings in the form of an electronic calendar or schedule 802 appears in the top portion of the user interface screen 800. If desired, this list of meetings 802 could actually be part of an electronic calendar or scheduler. The bottom portion 804 of the interface screen 800 allows the user to specify the information to be included in a meeting information box (or in another manner) in a new electronic note, as well as other optional aspects of the electronic note. While any suitable information may be included in this bottom portion 804 of the user interface display screen 800 without departing from the invention, the FIG. 6 example corresponds to the user interface screen 600 illustrated in the example of FIG. 4. By selecting a specific meeting from the top portion 802 of user interface screen 800 and specifying the desired information from the bottom portion 804 of the user interface screen 800, the user can open a new electronic document (e.g., by clicking "ok") that includes the desired meeting information for a specific meeting.

As another example, the bottom portion 804 in the interface screen 800 need not be included in all examples of the invention. For example, the interface and/or even an electronic calendar itself (or any other suitable user interface) may include a button or other options that allow a user to open a new electronic document for a specified meeting. When activated, this button (or other suitable options) will trigger systems and methods according to these examples of the invention to open or create a new electronic document that includes previously designated meeting information and/or newly designated meeting information.

As another potential option, systems and methods according to some examples of the invention could work in conjunction with a system clock that checks the time and automatically opens a new note including the meeting information for the next scheduled meeting. In some examples, this automatic opening feature could operate only within a certain time period around a meeting on the calendar, e.g., from 5 minutes before the scheduled meeting start time to 15 minutes after the scheduled start time. Various options or changes relating to these features also could be readily adopted without departing from the invention.

As yet another potential option, in addition to providing meeting information in the electronic document, systems and methods according to some examples of the invention may provide an electronic "stationary" on which the electronic document is produced. If desired, different stationeries could be used for different meetings. Also, as other alternatives, different stationeries could be provided on the system for different users, different companies, etc. The electronic stationary may include electronic letterhead, name, address, or any other desired information without departing from the invention.

In some examples of the invention, a computer operating system or application program, such as Windows® Journal (available from Microsoft Corporation of Redmond, Wash. in Windows XP™ (Tablet PC Edition)), may provide a pluggable architecture through which an electronic calendar system (such as Outlook® available from Microsoft Corporation of Redmond, Wash.) can register with the computer system and with Windows® Journal. After the electronic calendar system is installed and registered, an Insert Meeting Information interface may appear, in one of the various ways described above. Once the desired meeting is selected, the computer operating system or application program (such as Windows® Journal) can obtain the desired meeting information from the electronic calendar provider (e.g., Outlook®). This information may be used, for example, to create a meeting information text block on the inking surface, or otherwise add the meeting information data to the electronic document, e.g., in the various ways described above.

IV. Example Hardware

Figure 7:
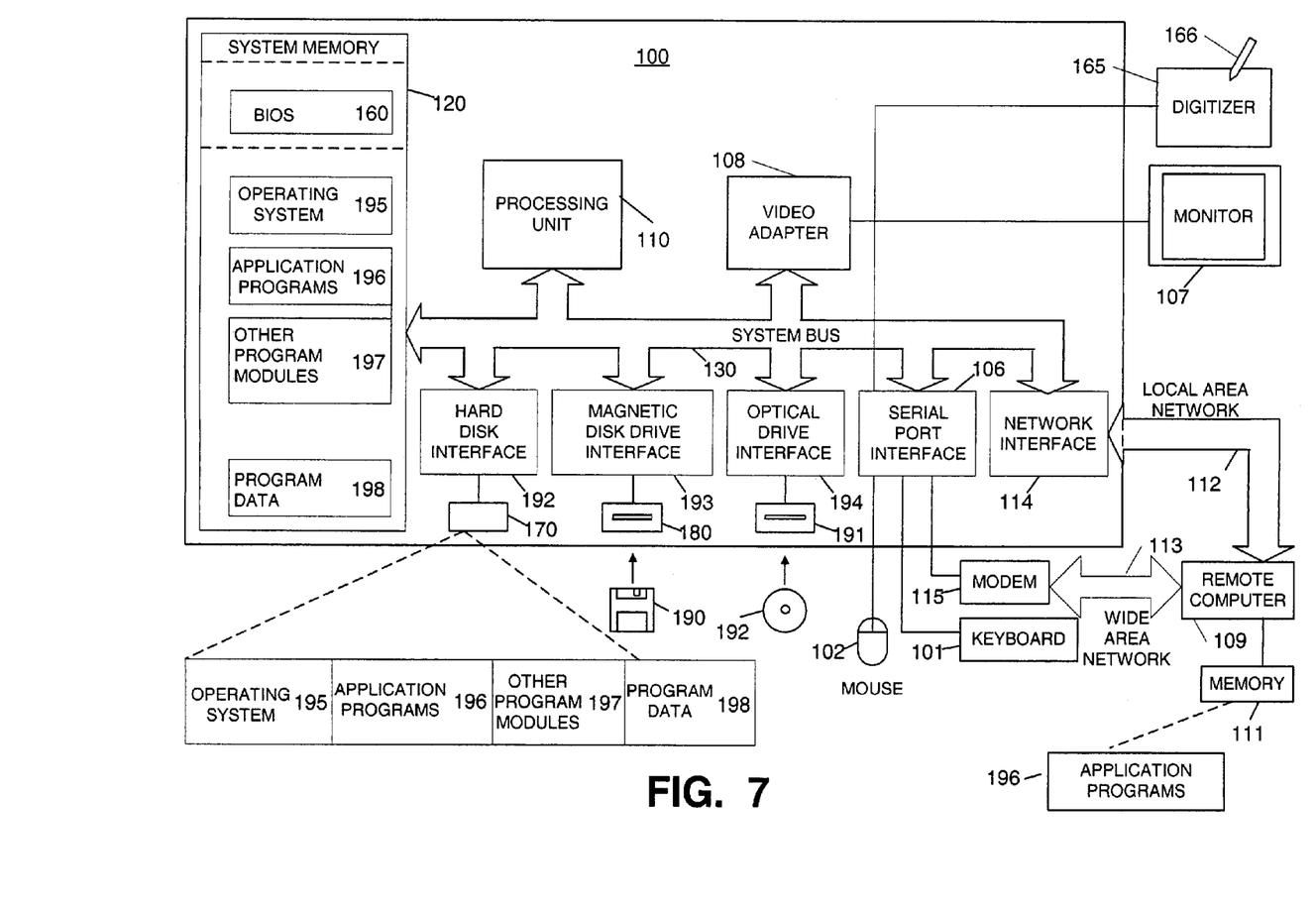
FIG. 7, which illustrates a schematic diagram of a conventional general-purpose digital computing environment in which one or more examples of the present invention may be implemented.

FIG. 7 illustrates a schematic diagram of a conventional general-purpose digital computing environment that can be used to implement various aspects of the present invention. In FIG. 7, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer readable instructions, data structures, program modules, and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB). Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 7, in practice, the pen digitizer 165 may be directly coupled to the processing unit 110, or it may be coupled to the processing unit 110 in any suitable manner, such as via a parallel port or another interface and the system bus 130 as known in the art. Furthermore, although the digitizer 165 is shown apart from the monitor 107 in FIG. 7, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 7. The logical connections depicted in FIG. 7 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 7 environment shows an example environment, it will be understood that other computing environments may also be used. For example, one or more examples of the present invention may use an environment having fewer than all of the various aspects shown in FIG. 7 and described above, and these aspects may appear in various combinations and subcombinations that will be apparent to one of ordinary skill.

Figure 8:
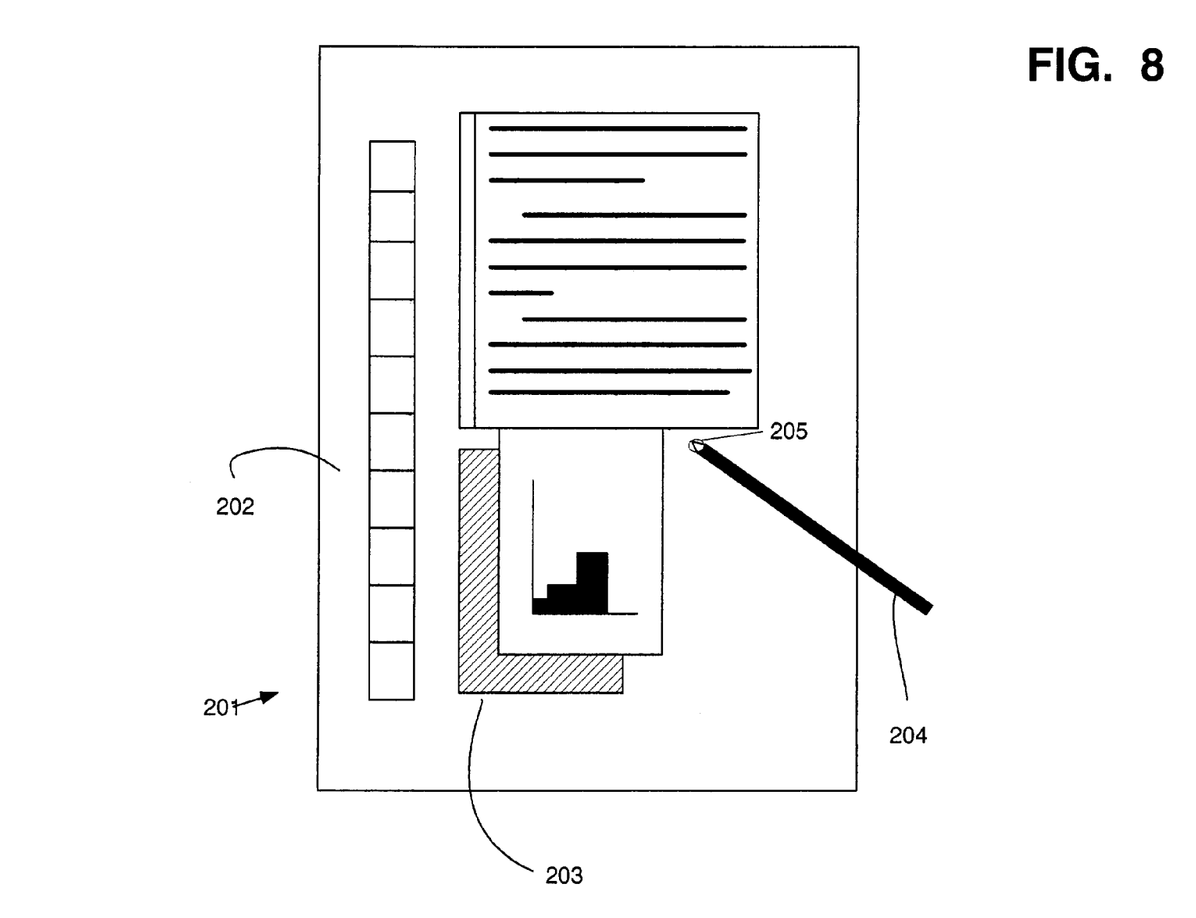
FIG. 8, which illustrates a pen-based personal computing (PC) environment in which one or more examples of the present invention may be implemented.

FIG. 8 illustrates a pen-based personal computer (PC) 201 that can be used in accordance with various aspects of the present invention. Any or all of the features, subsystems, and functions in the system of FIG. 7 can be included in the computer of FIG. 8. The pen-based personal computer system 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its selection capabilities. In one example, a stylus 204 could be implemented as a "pencil" or "pen", in which one end constitutes a writing portion and the other end constitutes an "eraser" end, and which, when moved across the display, indicates portions of the display that are to be erased. Other types of input devices, such as a mouse, trackball, or the like also could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

V. Conclusion

In many instances, the above examples describe this invention in terms of use with electronic ink. This is merely an example. This invention can be used in combination with any type of electronic document, including, for example, documents from word processing programs, documents downloaded from the Internet, etc. Also, the present invention can be used in conjunction with any suitable electronic calendar system.

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A method comprising:
    receiving meeting information including a start time in an electronic calendar system;
    receiving user input to an electronic note taking application within a threshold period of the start time and saving the user input as an electronic document; and
    automatically modifying the electronic document to include at least some of the meeting information from the electronic calendar system in response to receiving the user input to the electronic note taking application within the threshold period.

2. The method according to claim 1, wherein, prior to automatically modifying the electronic document, the method further includes receiving input indicating at least some of the meeting information to be included in the electronic document.

3. The method according to claim 1, wherein the electronic document is automatically given a name derived from at least a portion of the meeting information when it is saved.

4. The method according to claim 1, further comprising:
issuing a reminder at or before a scheduled meeting start time.

5. The method according to claim 1, further comprising:
in response to the electronic document being opened, providing a user interface that allows the user to specify or modify at least a portion of the meeting information to be included in the electronic document.

6. A system comprising:
an electronic calendar system configured to receive meeting information including a start time;
an electronic note taking application configured to receive user input and save the user input as an electronic document; and
a processor programmed to:
generate a prompt requesting selection of one of a plurality of meetings in a schedule;
receive input identifying the one of a plurality of meetings in the schedule; and
automatically modify the electronic document to include at least some of the meeting information responsive to the selected meeting being within a threshold period of the start time.

7. The system according to claim 6, wherein, prior to automatically modifying the electronic document, the processor further is programmed to receive input indicating at least some of the meeting information to be included in the electronic document.

8. The system according to claim 6, wherein the electronic document is automatically saved under a name derived from at least a portion of the meeting information.

9. The system according to claim 6, further comprising:
a reminder system for issuing a reminder at or before a scheduled meeting start time.

10. The system according to claim 6, further comprising:
a user interface that allows the user to specify or modify at least a portion of the meeting information to be included in the electronic document in response to the electronic document being opened.

11. A method comprising:
receiving user input to an electronic note taking application and saving the user input as an electronic document;
saving meeting information, including a start time, in a second application, the second application and the electronic note taking application being different applications; and
automatically including in the electronic document at least some of the saved meeting information from the second application responsive to the user input being entered into the electronic note taking application within a threshold period of the start time.

12. The method according to claim 11, wherein, prior to including the saved meeting information in the electronic document, the method further includes receiving input indicating at least some of the meeting information to be included in the electronic document.

13. The method according to claim 11, wherein the meeting information includes information corresponding to at least one member selected from the group consisting of: a title; a list of subjects on an agenda; a list of actual subjects discussed; a scheduled meeting start time; a scheduled meeting end time; actual meeting start time; actual meeting end time; a scheduled meeting date; actual meeting date; a scheduled meeting location; actual meeting location; a meeting organizer; a list of meeting attendees; a list of meeting invitees; a list of scheduled speakers; a list of actual speakers; a meeting agenda; a meeting schedule; and a user message regarding the meeting.

14. The method according to claim 11, wherein the electronic document is automatically given a name derived from at least a portion of the meeting information when it is saved.

15. The method according to claim 11, further comprising:
rendering the electronic document with at least some of the included meeting information in a visible portion of the electronic document.

16. The method according to claim 11, further comprising:
rendering the electronic document with at least some of the included meeting information in a background of the electronic document.

17. The method according to claim 11, further comprising:
rendering the electronic document with at least some of the included information in at least one of a header and a footer of the electronic document.

18. The method according to claim 11, wherein at least some of the meeting information included in the electronic document is included in metadata.

19. The method according to claim 11, further comprising:
issuing a reminder at or before a scheduled meeting start time.

20. The method according to claim 11, further comprising:
providing a user interface that allows the user to specify or modify at least a portion of the meeting information to be included in the electronic document before including the meeting information in the electronic document.

21. The method according to claim 11, wherein the user input is in the form of electronic ink.

22. The method according to claim 11, wherein the user input is in the form of machine-generated text.

23. A system comprising:
an electronic note taking application configured to receive user input and save the user input as an electronic document; and
a first application configured to save meeting information including a start time in a location other than the electronic document; and
a processor programmed to automatically include at least some of the saved meeting information from the first application in the electronic document in response to the user input being received within a threshold period of the start time.

24. The system according to claim 23 wherein the first application and the electronic note taking application are the same application.

25. The system according to claim 23, wherein the system receives input indicating at least some of the meeting information to be included in the electronic document.

26. The system according to claim 23, wherein the meeting information includes information corresponding to at least one member selected from the group consisting of: a title; a list of subjects on an agenda; a list of actual subjects discussed; a scheduled meeting start time; a scheduled meeting end time; actual meeting staff time; actual meeting end time; a scheduled meeting date; actual meeting date; a scheduled meeting location; actual meeting location; a meeting organizer; a list of meeting attendees; a list of meeting invitees; a list of scheduled speakers; a list of actual speakers; a meeting agenda; a meeting schedule; and a user message regarding the meeting.

27. The system according to claim 23, wherein the electronic document is automatically saved under a name derived from at least a portion of the meeting information.

28. The system according to claim 23, wherein the processor is programmed to modify the electronic document to include at least some of the meeting information in a visible portion of the electronic document.

29. The system according to claim 23, wherein the processor is programmed to modify the electronic document to include at least some of the meeting information in a background of the electronic document.

30. The system according to claim 23, wherein the processor is programmed to modify the electronic document to include at least some of the meeting information in at least one of a header and a footer of the electronic document.

31. The system according to claim 23, wherein the processor is programmed to tag the electronic document with metadata that represents at least some of the meeting information.

32. The system according to claim 23, further comprising:
a reminder system for issuing a reminder at or before a scheduled meeting start time.

33. The system according to claim 23, further comprising:
a user interface that allows the user to specify or modify at least a portion of the meeting information to be included in the electronic document.

34. The system according to claim 23, wherein the user input is in the form of electronic ink.

35. The system according to claim 23, wherein the user input is in the form of machine-generated text.

36. The method of claim 20, wherein modifications made to the portion of the meeting information to be included in the electronic document are back-annotated to the second application.

* * * * *